United States Patent [19]
Pecenka et al.

[11] Patent Number: 5,813,204
[45] Date of Patent: Sep. 29, 1998

[54] ROUND BALER HAVING TAILGATE-RESPONSIVE CLUTCH

[75] Inventors: Craig Pecenka, Newton; Howard J. Ratzlaff, Hesston, both of Kans.

[73] Assignee: Hay & Forage Industries, Hesston, Kans.

[21] Appl. No.: 731,768

[22] Filed: Oct. 18, 1996

[51] Int. Cl.$^6$ ................................................... A01F 15/07
[52] U.S. Cl. ................................. 56/341; 56/344; 100/88
[58] Field of Search .............................. 56/341, 342, 343, 56/344; 100/88, 89

[56] References Cited

U.S. PATENT DOCUMENTS

| | | |
|---|---|---|
| 3,110,145 | 11/1963 | Avery . |
| 3,789,593 | 2/1974 | Best et al. . |
| 4,026,205 | 5/1977 | Blanshine et al. . |
| 4,045,947 | 9/1977 | Mast . |
| 4,182,101 | 1/1980 | Gaeddert et al. . |
| 4,212,149 | 7/1980 | Krone et al. . |
| 4,252,057 | 2/1981 | Gaeddert et al. . |
| 4,424,662 | 1/1984 | Eggers et al. ............................... 56/341 |
| 4,425,753 | 1/1984 | Freimuth . |
| 4,434,607 | 3/1984 | Campbell .................................. 56/341 |
| 4,567,718 | 2/1986 | VanGinhoven . |
| 4,656,820 | 4/1987 | Jennings . |
| 5,097,760 | 3/1992 | Ratzlaff et al. . |

*Primary Examiner*—Terry Lee Melius
*Attorney, Agent, or Firm*—Hovey, Williams, Timmons & Collins

[57] ABSTRACT

A tailgate-responsive clutch of a round baler tensions a drive belt of the baler for drivingly connecting the bale forming components to a towing vehicle's power source when the clutch is engaged. An actuator is coupled with the clutch to engage and disengage the clutch in response to swinging of the tailgate. Particularly, the actuator is disposed for operable connection with the tailgate when the tailgate is in the closed position, whereby the clutch is engaged, and for disconnection from the tailgate when the tailgate is out of the closed position, whereby the clutch is disengaged. The actuator includes an operating member shiftable by the tailgate to engage the clutch as the tailgate approaches the closed position, wherein the operating member has a resilient portion capable of engaging the clutch, yet also flex and yieldably maintain the clutch engaged when the tailgate is in the closed position.

31 Claims, 5 Drawing Sheets

ROUND BALER HAVING TAILGATE-RESPONSIVE CLUTCH

CROSS-REFERENCE TO RELATED APPLICATIONS

See also the following contemporaneously filed applications for U.S. Letters Patent: Ser. No. 08/731,764, entitled DOWN TURNING STUB AUGERS ON WIDE PICK-UP FOR ROUND BALERS; Ser. No. 08/733,758, entitled OVER-THE-TOP SUPPORT ARM FOR PICK-UP GAUGE WHEEL OF A BALER; Ser. No. 08/733,757, entitled TALL SLEEVES FOR ROUND BALER DRIVE ROLLS; Ser. No. 08/731,395, entitled EASED INLET TAILGATE ROLL ARRANGEMENT FOR VARIABLE CHAMBER ROUND BALER; and Ser. No. 08/731,767, entitled END OF ROUND BALE TWINE GUIDES.

BACKGROUND OF THE INVENTION

1. Field of the Invention

The present invention relates generally to round balers and, more particularly, to an improved clutch for use with a belt drive of the baler which responds to swinging of the tailgate to drivingly disconnect and reconnect the crop pickup mechanism and drive rolls from the towing vehicle's power source as the tailgate is opened and closed.

2. Discussion of Prior Art

Balers have heretofore been provided with a clutch that disconnects the crop pickup and bale forming components from the tractor's PTO as the tailgate is opened, so that the PTO may run continuously during both baling and discharge operations. However, designs of conventional tailgate-responsive clutches have been considerably complex and unreliable. Additionally, in circumstances involving round balers having drive belts for drivingly connecting the forming components with the PTO wherein the clutch comprises an idler assembly for tensioning the belt, conventional clutches are not designed for yieldably maintaining the necessary tension on the drive belt as the belt tension varies due to wear and fluctuating operating loads, so that the drive belt, idler assembly and other clutch components enjoy a longer operating life. Moreover, most conventional clutches remain operably connected with the tailgate as it opens and closes, which limits movement of the tailgate, requires a clutch design that tends to be unreliable and highly susceptible to deterioration, and fails to ensure that the clutch is disengaged to drivingly disconnect the forming components from the PTO when the tailgate is out of the closed, baling position.

OBJECTS AND SUMMARY OF THE INVENTION

Accordingly, an important object of the present invention is to provide a relatively simple yet effective tailgate-responsive clutch, which can withstand the rigorous operating conditions of a round baler. To this end, another object of the present invention is to provide a clutch which operably disconnects from the tailgate during discharge operations. Another object of the present invention is to provide a tailgate responsive clutch which yieldably maintains a sufficient tensioning force against the belt to drivingly connect the baling components to the power source, while accommodate for variations in belt tension. Finally, the inventive clutch eliminates the need to stop the PTO and restart it each time a bale is discharged, which reduces the amount of time consumed in baling a quantity of crop material, while enhancing the longevity of the PTO and drive line coupling the PTO with the baler drive.

In accordance with these and other objects evident from the following description of a preferred embodiment of the invention, the round baler includes a drive mechanism having an endless drive belt which supplies driving power to bale forming components when the belt is under tension and a clutch for tensioning the belt when the clutch is engaged. Further, the baler includes an actuator coupled with the clutch and disposed for operable connection with the tailgate when the tailgate is in a closed position during bale formation, whereby the clutch is engaged to drivingly connect the forming components to the power source. The actuator is also disposed for disconnection from the tailgate when the tailgate is out of the closed position, whereby the clutch is disengaged to drivingly disconnect the forming components from the power source.

Preferably, the actuator includes a shiftable operating member that remains in a standby position with the clutch disengaged when the tailgate is out of the closed position. The member is shiftable by the tailgate out of the standby position to engage the clutch as the tailgate is moved to its closed position. The present invention also contemplates constructing the operating member as a lever having a resilient portion capable of engaging the clutch when the member is shifted out of the standby position by the tailgate, wherein the resilient portion is disposed to yieldably maintain the clutch engaged when the tailgate is in its closed position.

Further, the preferred clutch includes a pivotal idler arm having a rotatable idler sheave mounted thereto and disposed for engagement with the drive belt for tensioning the same as the idler arm pivots toward the belt. The idler arm is preferably coupled with the operating lever to pivot towards the drive belt as the lever swings out of the standby position. If desired, the actuator has an adjustable link pivotally connected between the lever and idler arm, which may be extended or retracted. As will be apparent, the adjustable link allows the operator to control pivoting of the idler arm to accommodate for variations in stock belt lengths and slackening of the belt due to wear.

BRIEF DESCRIPTION OF THE DRAWING FIGURES

A preferred embodiment of the invention is described in detail below with reference to the attached drawing figures, wherein.

Figure 5:
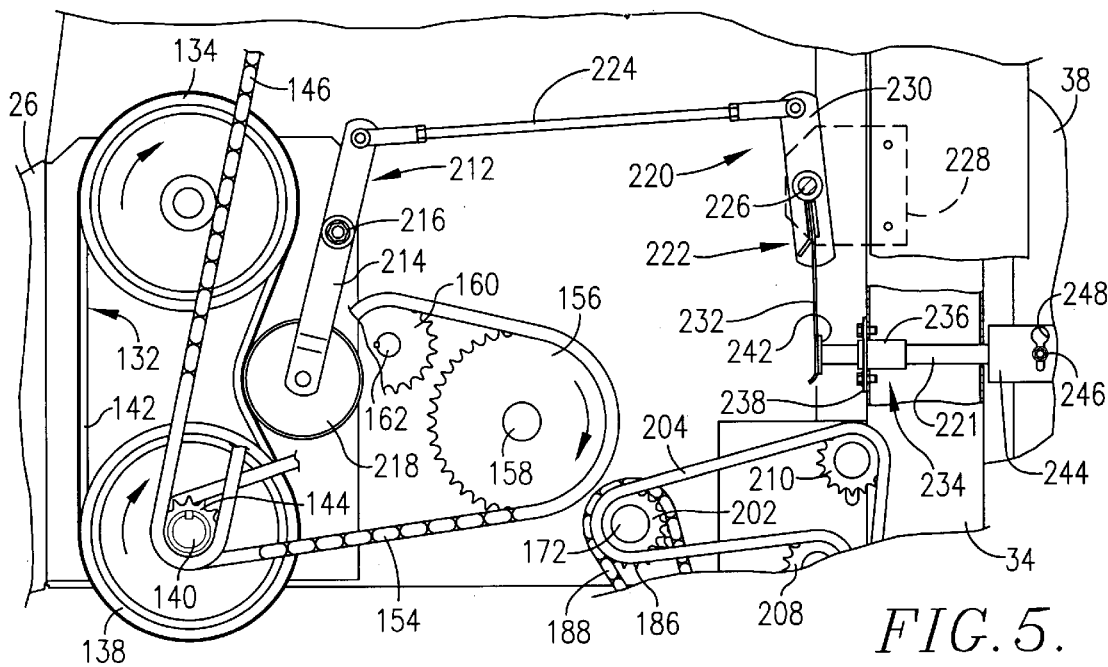
FIG. 5 is an enlarged, fragmentary, left side elevational view of the baler with the tailgate in the closed, baling position, engaging the clutch.
Figure 6:
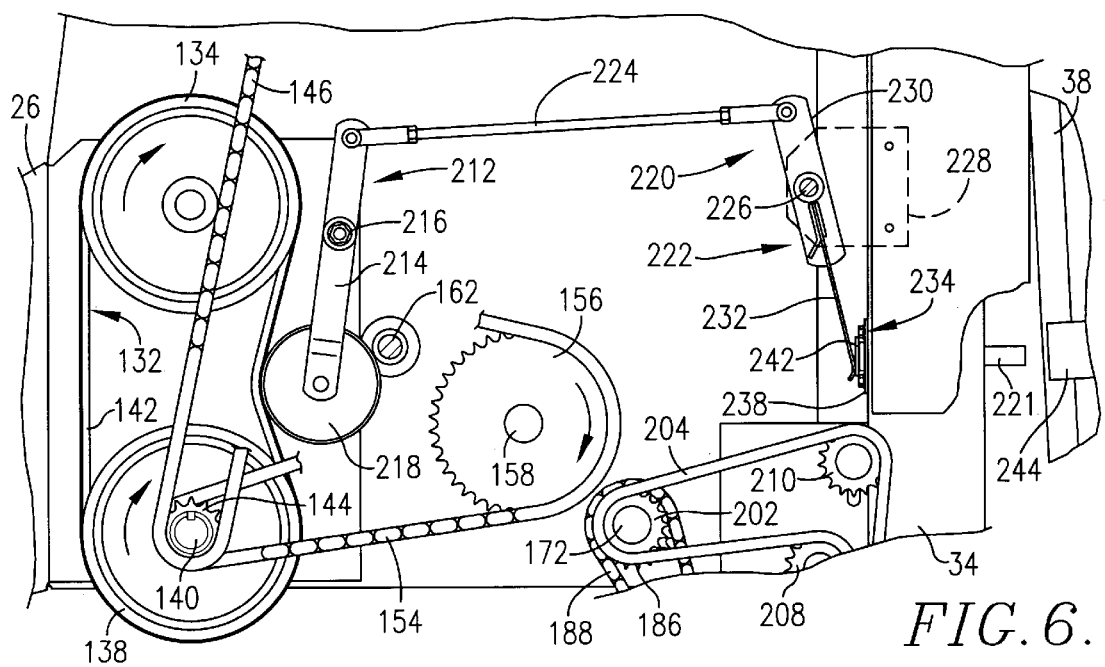
Figure 7:
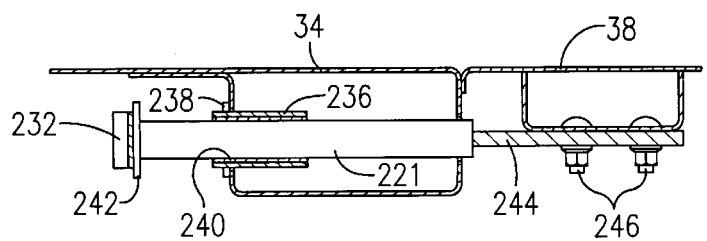

FIG. 6 is an enlarged, fragmentary, left side elevational view similar to FIG. 5, but with the tailgate slightly ajar, disengaging the clutch; and FIG. 7 is an enlarged, fragmentary, horizontal cross-sectional view of portions of the clutch, particularly the plunger slidably mounted within the baler frame and the plate attached to the tailgate, illustrating the tailgate in the closed, baling position, wherein the plunger is shifted to its forwardmost, clutch-engaging position.

DETAILED DESCRIPTION OF THE PREFERRED EMBODIMENT

Turning now to the drawings, the round baler 10 selected for illustration generally includes a chassis 12, a frame 14 carried by the chassis which defines a space within which bale forming and wrapping operations are performed, bale forming components 16 for rolling and compacting the crop material (see FIG. 3), crop pickup mechanism 18 for delivering crop material from a windrow to the forming components 16, and drive mechanism 20 including a series of drive trains for drivingly connecting the forming components 16 and pickup mechanism 18 to the power source of a towing vehicle (not shown).

The chassis 12 has a pair of ground wheels 22,24 and a forwardly extending tongue 26 that is adapted for connection with the towing vehicle. The frame 14, carried by the chassis 12, includes an upright left sidewall 30 and a laterally spaced, upright right sidewall 32. The sidewalls 30 and 32 are each braced by an upright, generally box-shaped support 34 and 36, respectively, which are mounted on the chassis 12 by suitable methods, such as welding or mechanical fasteners.

Figure 3:
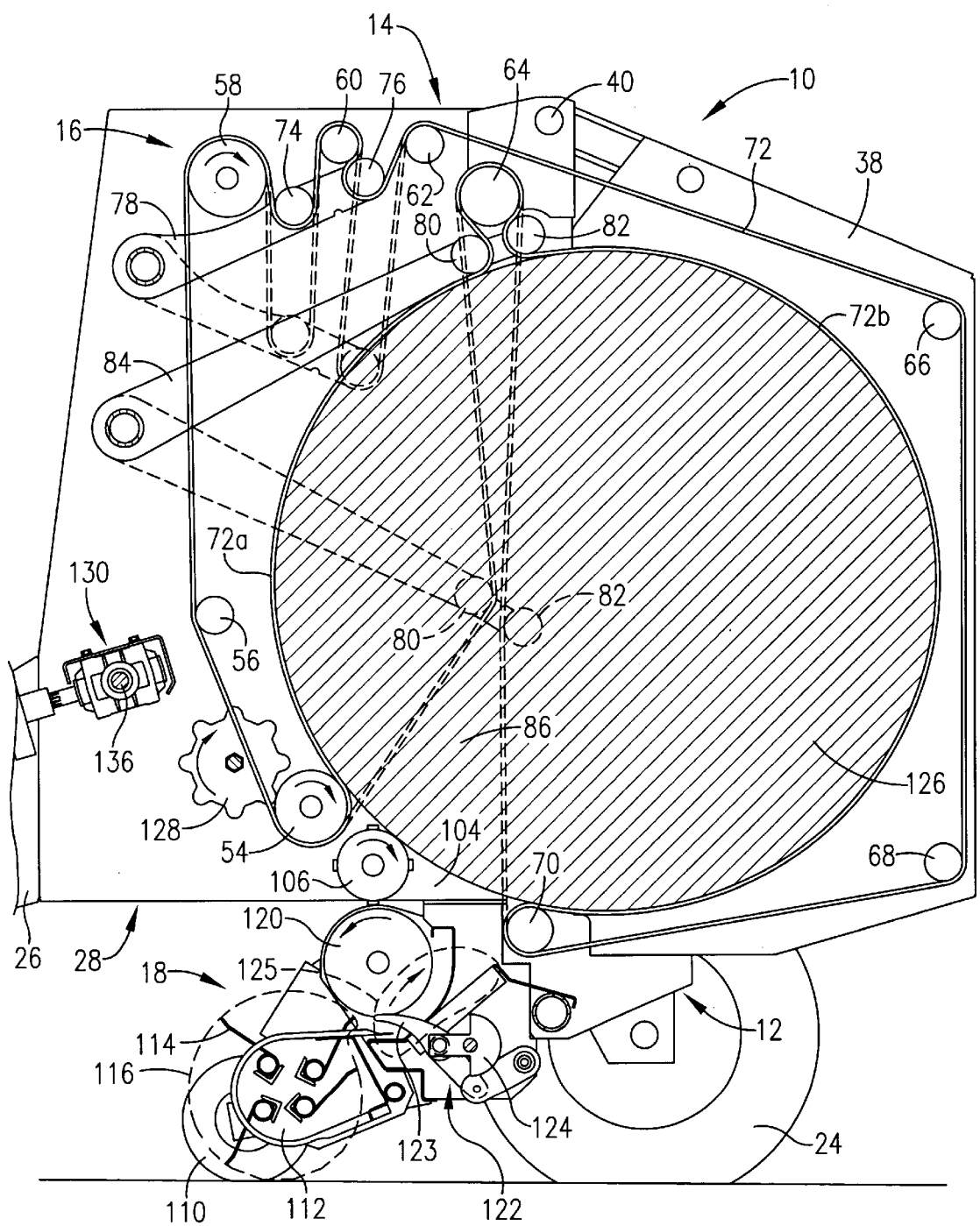
FIG. 3 is a fragmentary, vertical cross-sectional view of the baler with a full-size bale in the chamber, the left sidewall of the machine being removed to reveal the bale forming components.

The sidewalls 30,32 are divided along a generally vertical line to define a forward portion 28 and a swingable tailgate 38 mounted to the forward portion 28 by a transversely extending pivot 40 (see FIG. 3). The tailgate 38 is swingable between an open discharge position (not shown), in which the tailgate has sufficiently raised to allow a completely formed bale to be discharged from the baler 10, and a closed baling position (see FIG. 3), in which bale wrapping and rolling operations are performed.

The tailgate 38 is selectively swung between the discharge and baling positions by a pair of cylinders 42 and 44 disposed exteriorly of sidewalls 30 and 32, respectively. Preferably, the cylinders 42,44 are pivotally connected between brace-plates 46,48, which are attached to the forward portion 28, and lugs 50,52, which are attached to the tailgate 38. Although not illustrated, the cylinders 42,44 are operably coupled with a latch mechanism for releasably latching the tailgate 38 to the forward portion 28 during baling operations. If desired, the latch mechanism may be similar in principle to the construction disclosed in U.S. Pat. No. 4,182,101, entitled MACHINE FOR COILING FIBROUS CROP MATERIALS INTO LARGE ROUND BALES, assigned of record to the assignee of the present application. Suffice it to explain that upon extension of the cylinders 42,44, the latch mechanism is unlatched thereby so that the tailgate 38 may swing to the discharge position. Additionally, once the tailgate 38 has returned to the baling position, the latch mechanism is biased to automatically latch so that the tailgate is prevented from inadvertently swinging toward the discharge position during baling operations.

In the illustrated embodiment, the bale forming components 16 and sidewalls 30,32 cooperate to define a "variable chamber" which is initially relatively small but then grows progressively larger as the bale increases in diameter within the baler 10. It will be appreciated, however, that the principles of the present invention are equally applicable to a "fixed chamber" machine in which the dimensions of the baling chamber are at least substantially constant throughout the baling cycle, with the diameter of the chamber corresponding substantially with the diameter of the full size bale.

With the forgoing caveat in mind, the variable chamber baler illustrated herein includes a series of cooperating belts and rollers supported by the sidewalls 30,32 for compacting and rolling the bale as it forms within the baler 10. Turning particularly to FIG. 3, the baler 10 is provided with a plurality of stationary rolls 54, 56, 58, 60, 62, 64,66, 68 and 70 which span the sidewalls 30, 32 in a general circular pattern viewing FIG. 3 for guiding a plurality of endless, side-by-side belts 72 as the belts 72 are driven linearly during bale formation and wrapping. A pair of movable slack takeup rolls 74 and 76 are mounted near the upper portion of the baler 10 on arm structure 78, which is moveable upwardly from the phantom line position to the solid line position to permit the paying out of stored slack as the bale increases in diameter during formation. Near the fore-and-aft center of the baler 10, the belts 72 are looped under the lower roll 54, over the upper roll 64, and under the lower roll 70 to present a pair of opposed, front and rear runs 72a and 72b which are initially generally upright, as illustrated in phantom in FIG. 3, but which become bowed out in fore-and-aft directions, as illustrated in solid lines, as the bale grows beyond its initial starting core dimensions. A pair of retaining rollers 80 and 82 are mounted on a second swingable arm structure 84, the retaining rollers 80,82 receiving the belt runs 72a and 72b therebetween so as to form a baling chamber 86 between the runs 72a, 72b, which is bounded at the sides by the sidewalls 30,32.

Initially, the chamber 86 assumes a generally upright, somewhat triangular configuration, as shown in phantom lines in FIG. 3, with the retaining rollers 80,82 at the apex of the chamber 86. Thereafter, the chamber 86 becomes distended and circular in transverse configuration as the growing bale pushes forwardly on the belt run 72a and rearwardly on the belt run 72b to cause additional slack to be paid out and for the arm 84 to rise as additional hay is progressively added to the bale.

It will be appreciated that the baler 10 is provided with structure for restricting upward movement of the arms 78,84 so that during a baling cycle, tension on the belts 72 is maintained. Details of this structure are not set forth herein in view of the fact that those skilled in the art are well acquainted with constructional details of such structure. Suffice it to point out that such structure may include spring assemblies (not shown) which bias the arms 78, 84 into the respective phantom line positions. If desired, the spring assemblies utilized with the present invention may be similar in principle to the construction disclosed in U.S. Pat. No. 4,252,057, entitled BALE TENSIONING APPARATUS IN A ROTARY BALER, also assigned of record to the assignee of the present application.

Figure 1:
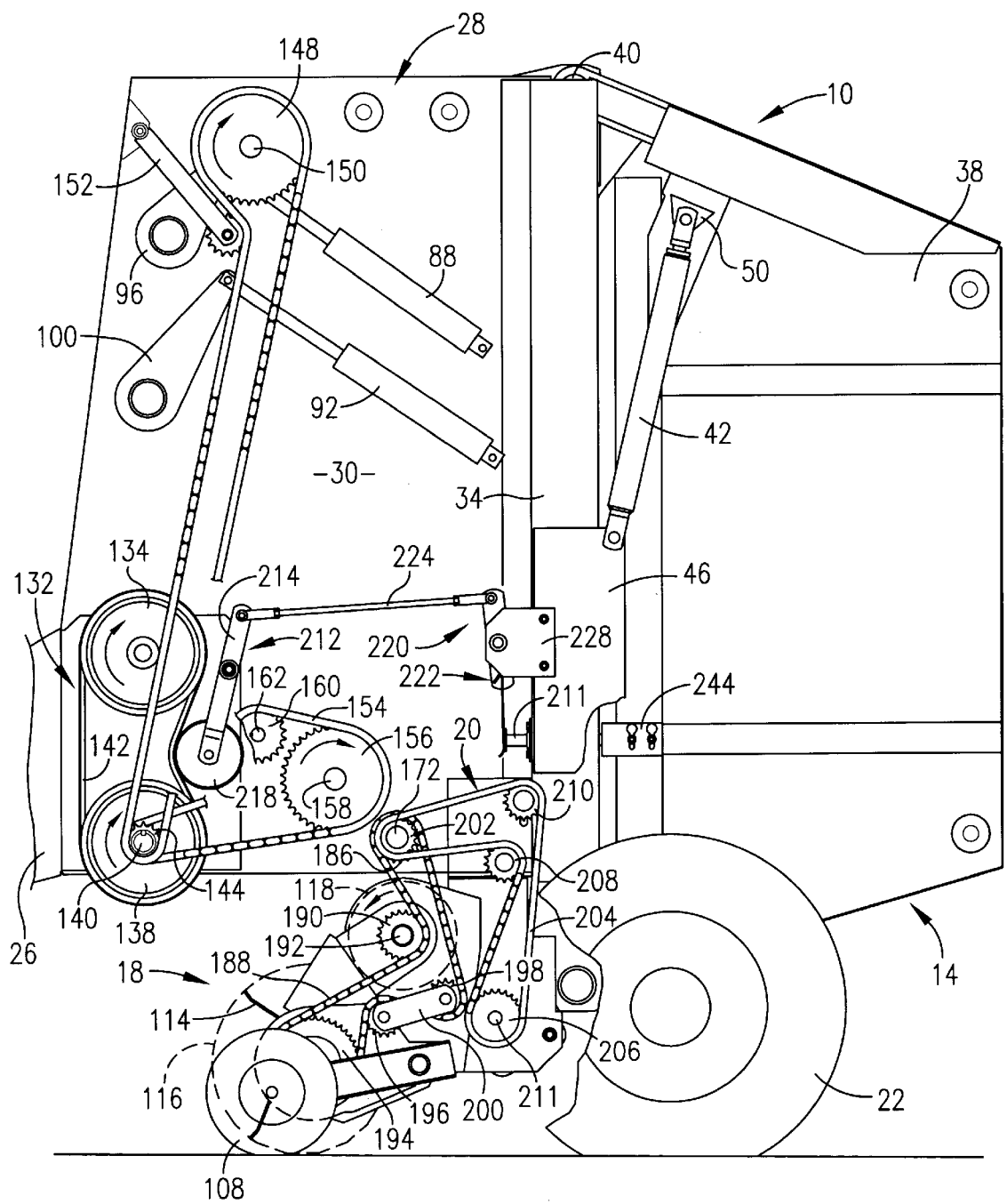
FIG. 1 is a fragmentary, left side elevational view of a round baler constructed in accordance with the principles of the present invention depicting the tailgate of the baler in the closed, baling position, with parts being broken away to illustrate various drive trains of the baler.
Figure 4:
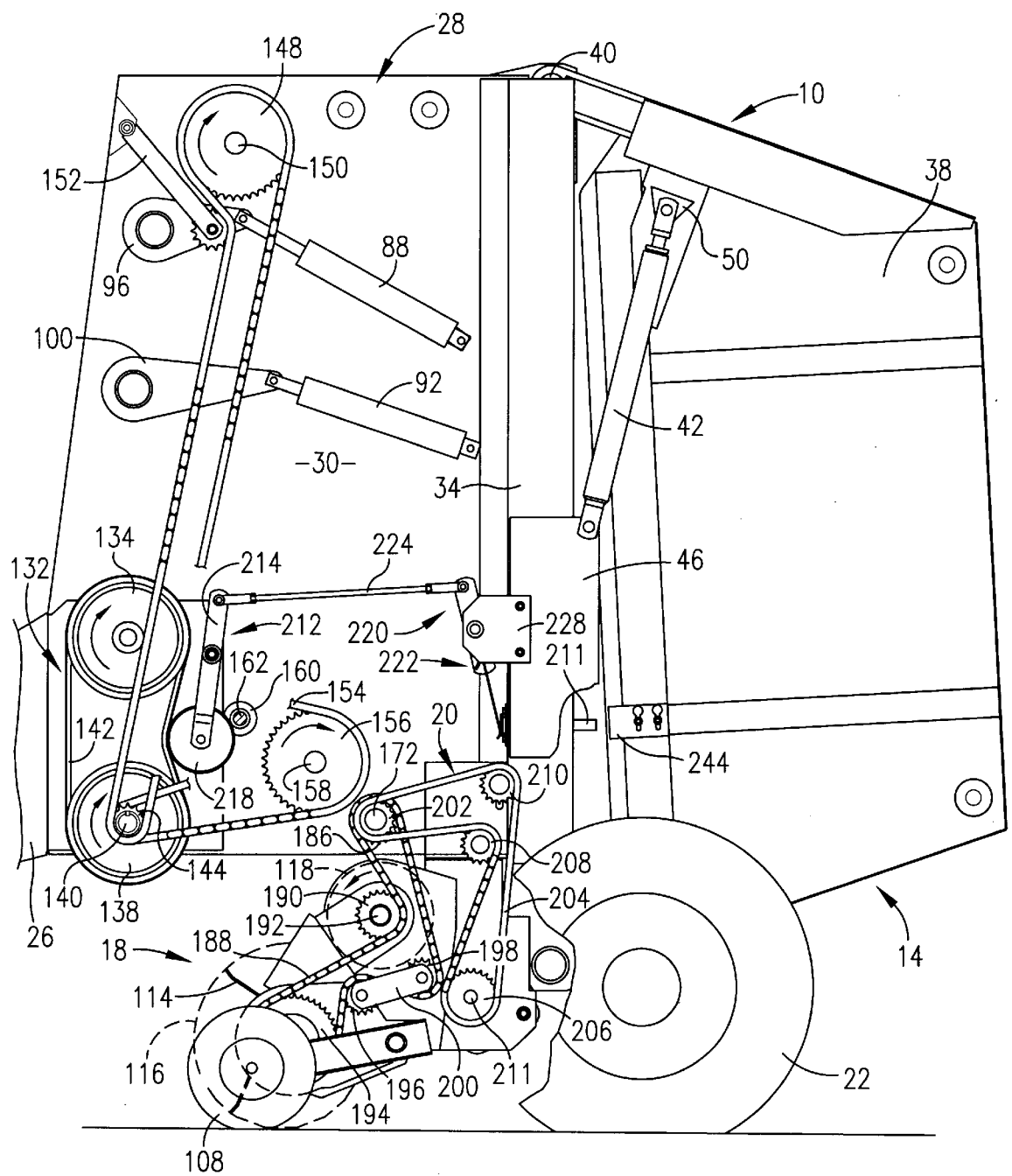
FIG. 4 is a left side elevational view similar to FIG. 1, but illustrating the tailgate slightly ajar, causing the clutch to disengage the drive train to the pickup and forming belts.

As alternatively depicted in the preferred embodiment, upward movement of each of the arms 78 and 84 may be restricted by hydraulic structure including two pairs of exteriorly disposed hydraulic cylinders 88,90 and 92,94, which are coupled with the arms 78 and 84 by two pairs of cranks 96,98 and 100,102, respectively. The cranks 96,98 and 100,102 are fixedly attached to the arms 78 and 84, so that swinging movement of the arms is imparted to the respective cranks. The hydraulic structure is configured so that as a bale grows within chamber 86, the arms 78 and 84 rise causing the hydraulic cylinders 88,90 and 92,94 to extend (see FIGS. 1 and 4 illustrating the cylinders in relative extended and retracted positions). During bale formation, each pair of cylinders 88,90 and 92,94 are hydraulically coupled with closed circuits (not shown) having a flow restriction device interposed therein for restricting flow through the circuit. Accordingly, extension of the cylinders 88,90,92,94 and corresponding upward movement of the arms 78,84 is restricted so that the arms maintain tension on the belts 72. After a bale has been discharged from the chamber 86, the cylinders are hydraulically coupled with an open circuit (also not shown), which permits unrestricted retraction thereof. The arms 78,84 are then moved downwardly to the phantom line position by a set of relatively weak tension springs (not shown).

The chamber 86 is open at the bottom to present an entrance 104 that is defined between the rear roll 70 and a starter roller 106. The crop pickup mechanism 18, supported generally below the entrance 104 and forwardly of the roll 70, is operable to lift crop material off the field as the baler 10 is advanced and to feed the material into the chamber 86 via the entrance 104. In the illustrated embodiment the pickup 18 is a wide pickup that projects beyond the sidewalls 30,32 so that a large windrow that is wider than the baler itself may be delivered to the chamber 86. Such a pickup is disclosed in contemporaneously filed patent application, Ser. No. 08/731,764, filed Oct. 18, 1996, entitled DOWN TURNING STUB AUGERS ON WIDE PICK-UP FOR ROUND BALERS, assigned of record to the assignee of the present invention.

In short, the preferred pickup mechanism 18 includes adjustable gauge wheels 108,110 for maintaining the elevation of a retracting finger reel 112 as the baler 10 passes over uneven ground. Rotation of the pickup reel 112 drives the tines 114 along the path best illustrated in phantom in FIG. 3, denoted by the number 116, to convey crop material upwardly from the ground to a pair of center-gathering, left and right stub augers, 118 and 120 respectively. The stub augers 118 and 120 rotate counterclockwise viewing FIGS. 1, 3 and 4. It will be appreciated that the augers 118, 120 converge the flow of crop material to a width generally equal to the width of the baling chamber 86. A stuffer 122 (FIG. 3) having a plurality of stuffer fingers 123 is driven by crank 124 along path 125 to feed the converged flow of crop material rearwardly through the entrance 104 and into chamber 86.

The roll 54 and the roll 58 are drive rolls for the belts 72 and are driven in clockwise directions viewing FIG. 3. Thus, when the baling chamber 86 is in its initial upright condition, as shown in phantom lines in FIG. 3, the front run 72a is moving generally downwardly and forwardly while the rear run 72b is moving generally upwardly. Consequently, hay introduced into the chamber 86 via the entrance 104 is acted upon by the upwardly moving rear run 72b and the downwardly moving front run 72a so as to tumble forwardly and coil into a growing bale. Assisting in the initial starting of the core and the coil-up action is the starter roller 106 which is driven in a clockwise direction viewing FIG. 3.

During the formation of the bale, which is illustrated in its final size in solid lines in FIG. 3 and is denoted by the numeral 126, a small amount of hay is sloughed off the bale 126 due to slippage between the belts 72 and the surface of the bale, and some of that residue tends to collect within the open area immediately above the roll 54 and forwardly of the front belt run 72a. However, such accumulating material is immediately discharged from that area by the action of the cleanout discs, broadly denoted by the numeral 128 in FIG. 3, which protrude into the collecting region and have their protruding portions moving downwardly in a direction oppositely to the upwardly moving belts 72 in that area.

Such cleanout discs 128 are the subject of U.S. Pat. No. 5,097,760, entitled POWERED TRASH REMOVAL APPARATUS FOR ROUND BALER, assigned of record to the assignee of the present.

Figure 2:
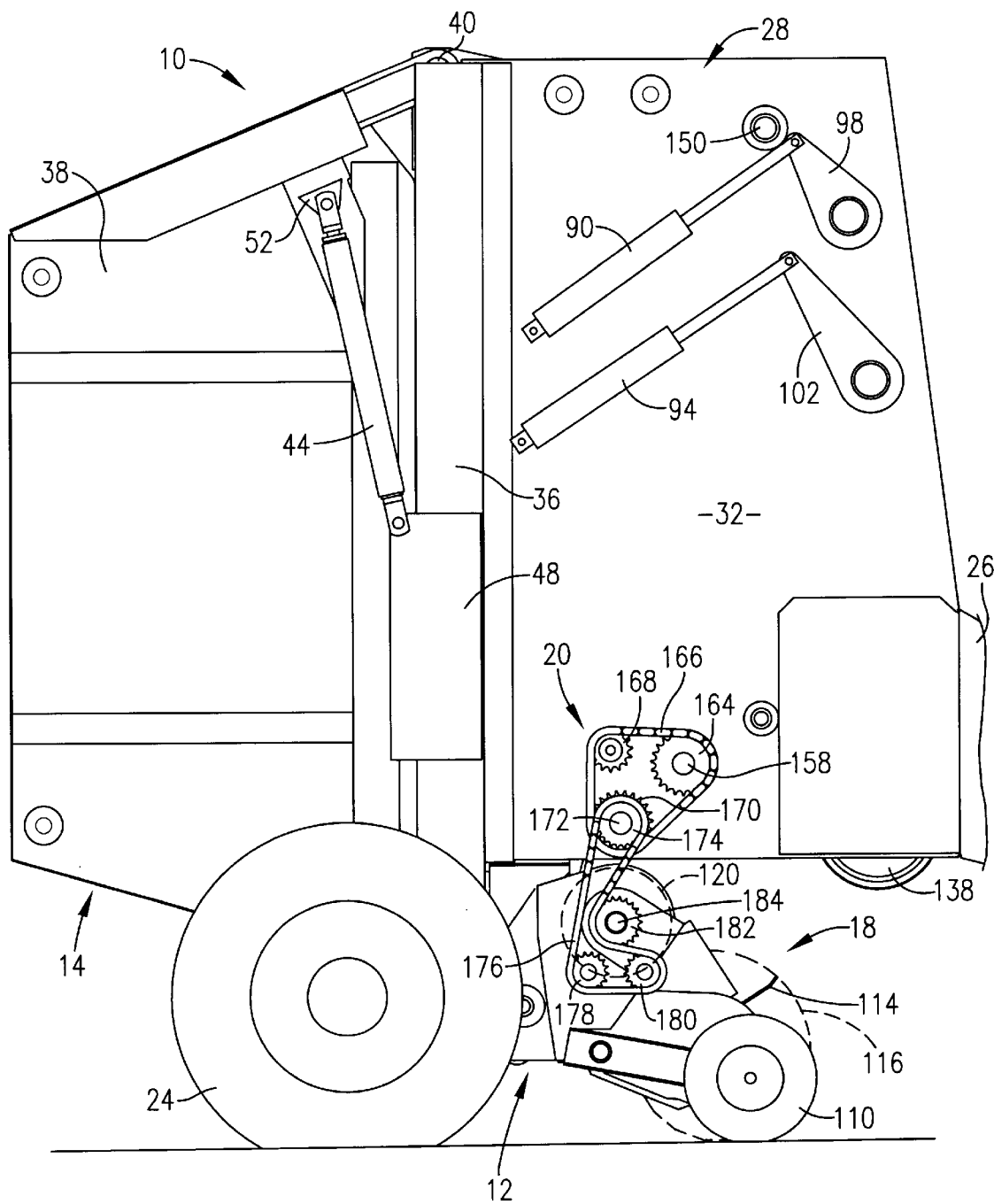
FIG. 2 is a fragmentary, right side elevational view of the baler.

Turning particularly to FIGS. 1, 2 and 4 illustrating the baler drive mechanism 20, it will be seen that input power to the drive rolls 54,58, cleanout discs 128, starter roll 106 and pickup mechanism 18 is provided by a right angle gearbox 130 (FIG. 3) situated at the rear of the tongue 26 which is connected through a drive line (not shown) to the power source of the towing vehicle. A belt drive, broadly referenced by the numeral 132, is provided to drivingly connect and disconnect these baling components with the gearbox 130. Preferably, the belt drive 132 includes a drive sheave 134 carried by the jack shaft 136 of the gearbox 130, a downwardly spaced driven sheave 138 carried by dual-sprocket shaft 140, and a flexible, endless belt 142 entraining the sheaves 134 and 138. The belt 142 is of sufficient length to slacken and permit slippage between the belt and sheaves 134,138, but can be tensioned to grip the sheaves 134,138 and transmit torque from the drive sheave 134 to the driven sheave 138. Accordingly, the drive sheave 134 may be continuously driven by the power source, and the driven sheave 138 may be selectively connected and disconnected with the drive sheave 134 by tensioning and slackening of the belt 142. It will be appreciated that when the belt 142 is sufficiently tensioned to drivingly connect the driven sheave 138 to the drive sheave 134, both sheaves 134,138 rotate in the clockwise direction viewing FIG. 1 to present a left taut run and right slack run.

Turning now to the various chain drives connected with the driven sheave 138, the dual sprocket shaft 140 includes an outer sprocket 144 that is entrained by an endless chain 146 extending generally upwardly to wrap around sprocket 148 on a shaft 150 of the upper drive roll 58 to rotate the drive roll 58 in a clockwise direction viewing FIG. 3. As shown in FIGS. 1 and 4, a takeup lever 152 is disposed adjacent the slack run of chain 146, which may be spring biased or manually set to take up slack of chain 146. The dual sprocket shaft 140 also carries an inner sprocket (not shown) that is entrained by a second endless, generally fore-and-aft extending chain 154. The chain 154 also entrains a large sprocket 156 carried on shaft 158 of the lower drive roll 54 and a relatively smaller sprocket 160 carried on shaft 162 of the cleanout discs 128. Accordingly, the drive roll 54 and cleanout discs 128 rotate in a clockwise direction viewing FIG. 3 so that the cleanout discs 128 move in a generally opposite direction to the upward travel of belts 72, as previously described.

The drive roll shaft 158 extends transversely through the baler 10 and carries a sprocket 164 exteriorly of right sidewall 32 (see FIG. 2). An endless chain 166 entrains sprocket 164, idler sprocket 168 and a downwardly and rearwardly disposed sprocket 170 carried on shaft 172 of the starter roller 106. Thus, the drive roll shaft 158, which is drivingly connected with the belt drive 132 via chain 154, provides driving power to the starter roller 106 to drive the starter roller 106 in a clockwise direction viewing FIG. 3.

The shaft 172 also carries relatively smaller sprocket 174 adjacent the right end thereof. The sprocket 174 is entrained by an endless chain 176 which extends generally downwardly to a pair of idler sprockets 178,180 which serve to back-wrap a sprocket 182 carried on stub shaft 184 of the right auger 120, whereby the auger 120 rotates in a direction (clockwise viewing FIG. 2) opposite to the direction of rotation of the starter roller shaft 172. In a similar manner, the starter roller shaft 172 extends transversely through the baler 10 and carries an inboard sprocket 186 exteriorly of the left sidewall 30. An endless chain 188 extends from the sprocket 186 generally downwardly to back-wrap a sprocket 190 carried on a stub shaft 192 of the left auger 118. The chain 188 extends forwardly from sprocket 186 to entrain a relatively larger sprocket 194 carried by a shaft (not shown) of the pickup roll 112, and extends rearwardly from the sprocket 194 to a pair of idler sprockets 196,198 carried on a swingable takeup bar 200. In this respect, the starter roller shaft 172, which is driven by drive roll shaft 158 via chain 166 on the right side of the baler 10, drives the left auger 118 in a counterclockwise direction and the pickup roll 112 in a clockwise direction (viewing FIG. 1) via chain 188 on the left side of the baler 10.

The starter roller shaft 172 further carries an outboard sprocket 202 at the left end thereof. A chain 204 drivingly connects the sprocket 202 with a sprocket 206 that is disposed rearwardly and downwardly from the former. A pair of idler sprockets 208,210 are provided to direct travel of the chain from sprocket 202 to the sprocket 206. In this respect, clockwise rotational movement of the starter roller shaft 172 is imparted to a stuffer finger assembly shaft 211 to drive the fingers 123 in a general clockwise direction viewing FIG. 3.

It will be appreciated that when the driven sheave 138 is drivingly connected to the drive sheave 134, the chain drives described hereinabove provide driving power to the various baling components. Although all of the baling components have been illustrated as being connected with the driven sheave 138, it is entirely within the scope of the present invention to drivingly connect some of the baling components directly to the drive sheave 134 so that such baling components are continuously driven by the power source, even when the belt 142 is slackened. For example, it may be desired that the crop pickup mechanism 18 continue to operate during discharge of a bale, and accordingly, a chain drive may be provided to entrain the necessary sprockets and a sprocket (not shown) carried by jack shaft 136.

TAILGATE-RESPONSIVE CLUTCH

A tailgate-responsive clutch, generally designated 212, is engaged when the tailgate is in the closed, baling position, whereby the belt 142 is sufficiently tensioned to drivingly connect the driven sheave 138 to the drive sheave 134. The preferred clutch 212 is constructed as a traditional idler assembly having an idler arm 214 pivotally mounted to the baler by threaded fastener 216, and an idler sheave 218 rotatably mounted at the lowermost end of the arm 214. The idler arm 214 pivots in a clockwise, tensioning direction in which the idler sheave 218 progressively engages the belt 142, and an opposed counterclockwise, slackening direction (viewing FIGS. 1 and 4–6).

An actuator, generally denoted by the numeral 220, is provided to engage and disengage the clutch 212 in response to movement of the tailgate 38 into and out of its closed position. The actuator 220 includes a slidable plunger 221 disposed for operable engagement with the tailgate 38, an operating lever 222 and a turnbuckle link 224 pivotally connected between the upper ends of the idler arm 214 and lever 222.

The lever 222 is swingable about a pivot 226 in a forward, clockwise direction and a rearward, counterclockwise direction. A mounting bracket 228 carries the pivot 226 and is secured to the support 34 by sheet metal screws, rivets or other suitable means. Preferably, the lever 222 includes an upper rigid portion 230 and a lower resilient portion 232 attached to the rigid portion 230 for swinging movement therewith. The preferred resilient portion 232 is formed of 5160 annealed spring steel having a modulus of elasticity equal to $30 \times 10^6$ pounds per square inch (psi).

In the illustrated embodiment, the link 224 is pivotally connected between the uppermost ends of the rigid portion 230 and the idler arm 214 so that the lever 222 swings concurrently with pivoting of the idler arm 214. In other words, forward (clockwise) swinging of the lever 222 causes the idler arm 214 to swing in the tensioning direction, and vice versa. Similarly, rearward (counterclockwise) swinging of the lever 222 causes the idler arm 214 to pivot in the slackening direction, and vice versa. The turnbuckle link 224, as well known in the art, is constructed so that its length may be manually adjusted. As will be clarified below, adjusting the length of link 224 allows the baler operator to adjust the degree of pivoting of the idler sheave 218.

A mounting assembly 234 (FIG. 5) having a tubular, cylindrical sleeve 236 welded to a support flange 238 is provided to slidably support and locate the plunger 221 for operable engagement with the tailgate when it is in the closed position. A bushing 240 is secured within the sleeve 236 for slidably receiving the plunger 221. The sleeve 236 is welded to the flange 238, and the flange 238 is fastened to the support 34 by suitable means, such as threaded fasteners, for mounting the plunger within the support 34. The plunger 221 is provided with an oversized head 242 at its forwardmost end, which ensures engagement with the lever 222 and prevents the plunger 221 from being forced rearwardly out of the bushing 240.

Preferably, the tailgate 38 is provided with a plate 244 for engaging the rearmost end of the plunger 221, which is adjustable relative to the tailgate 38 so that engagement with the plunger 221 is ensured. As best shown in FIGS. 5 and 7, the plate 244 is secured to the tailgate 38 by threaded fasteners 246, each of which is received within an associated slot 248 cut in plate 244. Of course, it is entirely with the scope of the present invention to construct the present invention so that swinging of the lever 222 is affected by direct engagement with the tailgate 38. For example, the plate 244 may be elongated to extend through the support 34 to engage the lever 222, rather than provide a slidable plunger 221 disposed between the tailgate 38 and lever 222.

It will be appreciated that the preferred structure described hereinabove is able to tolerate manufacturing inaccuracies and "slop" caused by the rigorous operating conditions of the baler 10. For example, the length of link 224 may be adjusted to vary the degree of pivoting of the idler arm 214; the head 242 ensures interengagement between the plunger 221 and lever 222; and the plate 244 is adjustable to ensure connection between the plunger 221 and plate 244.

OPERATION

Assuming that a baling cycle begins with the tailgate 38 slightly ajar, as depicted in FIGS. 4 and 6, and with the power source of the towing vehicle operating so that the drive sheave 134 is rotating, the tailgate 38 must be lowered to the baling position so that the baling components are drivingly connected to the drive sheave 134. Although not illustrated in detail, it will be appreciated that as the plunger 221 is pushed forwardly by plate 244, the plunger 221 swings the lever 222 forwardly (clockwise), which in turn pivots the idler arm 214 in the clockwise tensioning direction. Thus, as the plunger 221 moves forwardly, the idler sheave 218 progressively increases the tension on the belt 142.

It will be appreciated that the lever 222, including the resilient portion 232, swings forwardly to gradually increase tension on the belt 142. However, at some point along the forward sliding path of the plunger 221, the belt 142 prevents further swinging of the resilient portion 232, yet the plunger 221 continues to slide forwardly until the tailgate 38 reaches the closed position. Preferably, once the tailgate 38 is in its closed position, the over-travel of the plunger 221 deflects the resilient portion 232 just enough to effect a sufficient spring force against the belt 142 for drivingly connecting the driven sheave 138 to the rotating drive sheave 134; that is, the clutch 212 is engaged without over-tensioning the belt 142.

The precision of the actuator 220 is controlled by adjustment of the length of the link 224. If the link 224 is shortened, the pivoting path of the idler arm 214 shifts forwardly; that is, the idler arm 214 rests in a position nearer the front of the baler, when the tailgate is in the discharge position, and pivots in the tensioning direction to a position nearer the front of the baler, when the tailgate is in the closed position. Conversely, if the operator extends the link 224, the pivoting path of the idler arm 214 is shifted rearwardly. This feature serves several purposes. For example, the tensioning force applied by the idler sheave 218 may be varied. If it is desired to slightly over-tension the belt 142 to accommodate for slackening of the belt caused by the wear, the link 224 is shortened. Similarly, in wet crop conditions, the operating loads of the baler increase often requiring a greater tensioning force to drivingly connect the driven sheave 138 to the drive sheave 134. Moreover, stock belts tend to vary from specifications from approximately 1.5% short to 2% long, which necessitates respective extension or retraction of the link 224, so that the preferred tensioning force is obtained. Such adjustment may also be necessary to accommodate for manufacturing inaccuracies.

As previously mentioned, the preferred material for the resilient portion 232 is 5160 annealed spring steel having a modulus of $30 \times 10^6$ psi. It has been determined that a suitable flexible section is approximately 1.5 inches wide, 0.105 inches thick, and amply long to present 6.0 inches between the fulcrum (pivot 226) and location of contact with the plunger 221. Such a section has proven suitable for use with most baler drive belts, providing enough rigidity to sufficiently tension the belt 142 for drivingly connecting the driven sheave 138 to the drive sheave 134, yet enough resiliency to yieldably flex upon fluctuations in the operating loads. In other words, the resilient portion 232 provides a spring cushion for the clutch and actuator components thereby enhancing the life of such components and the belt. It will be appreciated that this construction also provides predictable tensioning forces.

If desired, the lever 222 may alternatively be configured as a single, rigid body (i.e., not including the resilient portion 232). With the rigid lever construction, shifting of idler arm pivoting relative to swinging of the lever 222 tends to be more responsive to adjustment of the length of link 224, which facilitates adjustment of the tensioning force applied by the sheave 218.

Once the tailgate 38 is in the closed, baling position (see FIGS. 1 and 5), the baling components are driven by the belt drive 132 and bale formation may begin. The general mode of operation of the baler 10 should be apparent from the foregoing description. Suffice it to explain that a relatively small core of crop material begins tumbling forwardly within the empty baling chamber 86 at the commencement of bale formation as a result of the upwardly moving rear belt runs 72b and the generally downwardly and forwardly moving front belt runs 72a. As crop material continues to be picked up from the field and introduced into the chamber 86 through the open entrance 104 by mechanism 18, the core starts to grow in size and expands against the yieldable resistance offered by the belts 72. The bale continues to grow and the belts 72 continue to expand while rotating the bale until the bale finally reaches its full size as indicated in FIG. 3, in which the full size bale is denoted by the number 126.

Once a full size bale has been formed, the bale 126 is wrapped by suitable means, which are well known in the art and form no part of the present invention, per. se. Thereafter, the tailgate 38 is raised to the discharge position by hydraulic cylinders 42,44. As the tailgate 38 swings to the discharge position, the plate 244 disconnects from the plunger 221 so that the plunger 221 is free to move rearwardly. The operable disconnection from the tailgate 38 permits the lever 222 to swing rearwardly (counterclockwise) and the idler arm 214 to pivot in the slackening direction (counterclockwise). Preferably, the resiliency of the belt 142 pivots the idler arm 214 in the slackening direction and swings the lever 222 in the rearward direction as the tailgate moves out of its closed position. If desired, a relatively weak spring (not shown) is connected to the idler arm 214 to assist in biasing the idler arm 214 in the slackening direction.

As the tailgate is raised to the discharge position, the belt swings the lever 222 rearwardly to a standby position (see FIG. 6), in which the tension of belt 142 is sufficiently decreased to drivingly disconnect the driven sheave 138 from the drive sheave 134; that is, the clutch 212 is disengaged when the lever 222 is in its standby position. The oversized plunger head 242, which prevents the plunger 221 from being slid out of the mounting assembly 234, serves as a stop to prevent rearward travel of the lever 222 beyond the standby position. As shown in FIG. 6, the idler sheave 218 remains engaged with the belt 142, even with the lever 222 in the standby position. However, the tensioning force applied by the idler sheave 218 in this position is insignificant, and the drive sheave 134 is permitted to slip relative to the belt 142 so that driving power is not transmitted to the driven sheave 138 thereby. Moreover, once the lever 222 swings to the standby position, the tailgate 38 is operably disconnected therefrom as it continues to swing to the open position, yet the lever remains ready for operable connection with the tailgate 38 when it returns to the closed position for engaging the clutch 212.

If the link 224 has been properly adjusted, the baling components should cease operation immediately upon swinging of the tailgate 38 to the discharge position. Additionally, the baling components should not be drivingly connected to the power source until the tailgate swings completely to the closed position. If the belt 224 has been slightly overtensioned, the tailgate 38 must swing slightly to the discharge position before the components are drivingly disconnected from the power source. However, it will be appreciated that the tailgate 38 swings only a few inches before the belt 142 sufficiently slackens to drivingly disconnect the driven sheave 138 from the drive sheave 134. Accordingly, the swinging tailgate 38 maintains the full size bale 126 within the chamber 86 and prevents untoward shifting of the bale 126 until the baling components are drivingly disconnected from the belt drive 132.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. In a round baler having driveable bale forming components, a tailgate that is disposed in a closed position during bale formation, and drive mechanism including an endless drive belt which drivingly connects the bale forming components with a power source when under tension, the improvement comprising:

a pivotal idler arm having a rotatable idler sheave mounted thereto, the idler sheave being disposed for engagement with the drive belt for tensioning the drive belt as the idler arm pivots toward the drive belt; and a swingable operating lever operably coupled with the idler arm to swing in a first direction when the idler arm pivots toward the drive belt and a second direction as the idler arm pivots away from the drive belt, said lever being disposed for operable connection with the tailgate as the tailgate approaches its closed position to swing the lever in the first direction, whereby the idler arm pivots towards the drive belt and tensions the latter for drivingly connecting the bale forming components to the power source when the tailgate is in the closed position, and for disconnection from the tailgate as the tailgate moves out of the closed position allowing the lever to pivot in the second direction, whereby the idler arm pivots away from the drive belt for drivingly disconnecting the bale forming components from the power source.

2. In a round baler as claimed in claim 1, said lever including a resilient portion capable of sufficiently pivoting the idler arm towards the drive belt to drivingly connect the bale forming components to the power source, said resilient portion being disposed to yieldably maintain the driving connection when the tailgate is in the closed position.

3. In a round baler as claimed in claim 2, said resilient portion being flexed when the tailgate is in the closed position.

4. In a round baler as claimed in claim 3, said resilient portion being sufficiently flexed when the tailgate is in the closed position to apply a residual tensioning force against the drive belt, whereby the driving connection is yieldably maintained as the drive belt stretches.

5. In a round baler as claimed in claim 2, said lever further including a rigid portion operably coupled to the idler arm, said rigid portion being connected to said resilient portion to swing therewith.

6. In a round baler as claimed in claim 5, said lever being swingable about an axis generally defined by the connection between the rigid portion and resilient portion.

7. In a round baler as claimed in claim 5; and an adjustable link pivotally connected between the rigid portion of the lever and the idler arm, said link being extendable and retractable.

8. In a round baler as claimed in claim 1, said idler arm being urged by the drive belt to pivot away from the belt so that as the tailgate moves out of the closed position, the idler arm pivots away from the drive belt to swing the lever in the second direction and drivingly disconnect the bale forming components from the power source.

9. In a round baler as claimed in claim 8; and a stop in the path of travel of the lever as it swings in the second direction to prevent swinging of the lever caused by the drive belt beyond the stop, said stop serving to maintain the lever in a standby position with the bale forming components drivingly disconnected from the power source.

10. In a round baler as claimed in claim 9, said lever including a resilient portion capable of sufficiently pivoting the idler arm towards the drive belt to drivingly connect the bale forming components to the power source, said resilient portion being disposed to yieldably maintain the driving connection when the tailgate is in the closed position.

11. In a round baler as claimed in claim 1; and linkage connected between the lever and idler arm operably coupling the lever with the idler arm.

12. In a round baler as claimed in claim 11, said linkage including an adjustable link which is extendable and retractable.

13. In a round baler as claimed in claim 1; and a shiftable plunger interposed between said operating lever and the tailgate, said plunger being disposed for operating engagement with he tailgate as the tailgate approaches its closed position whereby to establish said operable connection between the lever and the tailgate, the tailgate being operable to swing the lever in the first direction using the plunger as the tailgate approaches its closed position.

14. In a round baler as claimed in claim 13, said lever including a resilient portion capable of sufficiently pivoting the idler arm towards the drive belt to drivingly connect the bale forming components to the power source, said resilient portion being disposed to yieldably maintain the driving connection when the tailgate is in the closed position.

15. In a round baler as claimed in claim 14, said resilient portion of the lever engaging the plunger as the lever swings in the first and second directions.

16. In a round baler as claimed in claim 15, said plunger being engaged as the tailgate swings to the closed position by a plate projecting from the tailgate, said plate being adjustably attached to the tailgate for ensuring engagement with said plunger.

17. In a round baler as claimed in claim 1, said bale forming components including crop pickup means for transferring crop material from the ground to the baler.

18. In a round baler as claimed in claim 1, said idler arm pivoting in the same general direction as swinging of the operating lever.

19. In a round baler having driveable bale forming components and a tailgate that is disposed in a closed position during bale formation, the improvement comprising:

drive mechanism including an endless drive belt which supplies driving power to the forming components when the belt is under tension;

a clutch for tensioning the belt when the clutch is engaged; and an actuator operably coupled with said clutch and disposed for operable connection with the tailgate when the tailgate is in its closed position, whereby to engage the clutch, and for disconnection from the tailgate when the tailgate is out of the closed position, whereby to disengage the clutch, said actuator including a shiftable operating member that remains in a standby position with the clutch disengaged when the tailgate is out of its closed position, said operating member being shiftable by the tailgate out of the standby position to engage the clutch as the tailgate is moved to its closed position, said operating member including a resilient portion capable of engaging the clutch when the member is shifted out of the standby position by the tailgate, said resilient portion being disposed to yieldably maintain the clutch engaged when the tailgate is in its closed position.

20. In a round baler as claimed in claim 19, said resilient portion being flexed when the tailgate is in the closed position.

21. In a round baler as claimed in claim 20, said resilient portion being sufficiently flexed when the tailgate is in the closed position to apply a residual tensioning force against the drive belt, whereby the driving connection is yieldably maintained as the drive belt stretches.

22. In a round baler as claimed in claim 19, said operating member being configured as a lever swingable into and out of the standby position.

23. In a round baler having driveable bale forming components and a tailgate that is disposed in a closed position during bale formation, the improvement comprising:

drive mechanism including an endless drive belt which supplies driving power to the forming components when the belt is under tension;

a clutch for tensioning the belt when the clutch is engaged;

an actuator operably coupled with said clutch and disposed for operable connection with the tailgate when the tailgate is in its closed position, whereby to engage the clutch, and for disconnection from the tailgate when the tailgate is out of the closed position, whereby to disengage the clutch, said actuator including a shiftable operating member that remains in a standby position with the clutch disengaged when the tailgate is out of its closed position, said operating member being shiftable by the tailgate out of the standby position to engage the clutch as the tailgate is moved to its closed position, said drive belt tending to urge the operating member toward its standby position; and a stop disposed in the path of travel of said operating member at such a location that the member is prevented from being shifted by the drive belt beyond said standby position as the tailgate is moved out of its closed position, said operating member including a resilient portion capable of engaging the clutch when the member is shifted away from said stop by the tailgate, said resilient portion being disposed to yieldably maintain the clutch engaged when the tailgate is in its closed position.

24. In a round baler having driveable bale forming components and a tailgate that is disposed in a closed position during bale formation, the improvement comprising:

drive mechanism including an endless drive belt which supplies driving power to the forming components when the belt is under tension;

a clutch for tensioning the belt when the clutch is engaged; and an actuator operably coupled with said clutch and disposed for operable connection with the tailgate when the tailgate is in its closed position, whereby to engage the clutch, and for disconnection from the tailgate when the tailgate is out of the closed position, whereby to disengage the clutch, said actuator including a shiftable operating member that remains in a standby position with the clutch disengaged when the tailgate is out of its closed position, said operating member being shiftable by the tailgate out of the standby position to engage the clutch as the tailgate is moved to its closed position, said actuator further including a shiftable plunger interposed between said operating member and the tailgate, said plunger being disposed for operating engagement with the tailgate as the tailgate approaches its closed position whereby to establish said operable connection between the actuator and the tailgate, the tailgate being operable to shift the operating member away from its standby position using the plunger as the tailgate approaches its closed position.

25. In a round baler as claimed in claim 24, said drive belt tending to urge the operating member toward its standby position, said plunger being slidably received within an opening of a frame element of the baler and disposed for engagement with the member as the member is urged by the belt towards the standby position such that shifting of the operating member towards the standby position slides the plunger in a first direction, said plunger including an outwardly projecting lip configured to engage the frame element and prevent sliding of said plunger in the first direction beyond the lip, said lip being disposed to prevent shifting of the operating member beyond said standby position as the tailgate is moved out of its closed position.

26. In a round baler as claimed in claim 25, said operating member including a resilient portion capable of engaging the clutch when the member is shifted out of the standby position by the tailgate, said resilient portion being disposed to yieldably maintain the clutch engaged when the tailgate is in its closed position.

27. In a round baler as claimed in claim 26, said resilient portion engaging said plunger as the operating lever moves into and out of the standby position.

28. In a round baler having driveable bale forming components and a tailgate that is disposed in a closed position during bale formation, the improvement comprising:

drive mechanism including an endless drive belt which supplies driving power to the forming components when the belt is under tension;

a clutch for tensioning the belt when the clutch is engaged; and an actuator operably coupled with said clutch and disposed for operable connection with the tailgate when the tailgate is in its closed position, whereby to engage the clutch, and for disconnection from the tailgate when the tailgate is out of the closed position, whereby to disengage the clutch, said actuator including a shiftable operating member that remains in a standby position with the clutch disengaged when the tailgate is out of its closed position, said operating member being shiftable by the tailgate out of the standby position to engage the clutch as the tailgate is moved to its closed position, said clutch including a pivotal idler arm having a rotatable idler sheave mounted thereto, said idler sheave being disposed to engage the drive belt for tensioning the drive belt as the idler arm pivots toward the drive belt, said idler arm pivoting towards the drive belt as the operating member shifts out of the standby position, said operating member including a resilient portion capable of engaging the clutch when the member is shifted out of the standby position by the tailgate, said resilient portion being disposed to yieldably maintain the clutch engaged when the tailgate is in its closed position.

29. In a round baler as claimed in claim 28, said operating member being configured as a lever swingable into and out of the standby position.

30. In a round baler as claimed in claim 29, said actuator including linkage for operably coupling the operating lever with the idler arm so that swinging of the operating lever out of the standby position is in the same general direction as pivoting of the idler arm toward the drive belt.

31. In a round baler as claimed in claim 29, said actuator including an adjustable link operably coupling the operating lever with the idler arm, said link being extendible and retractable.

\* \* \* \* \*